UNITED STATES PATENT OFFICE.

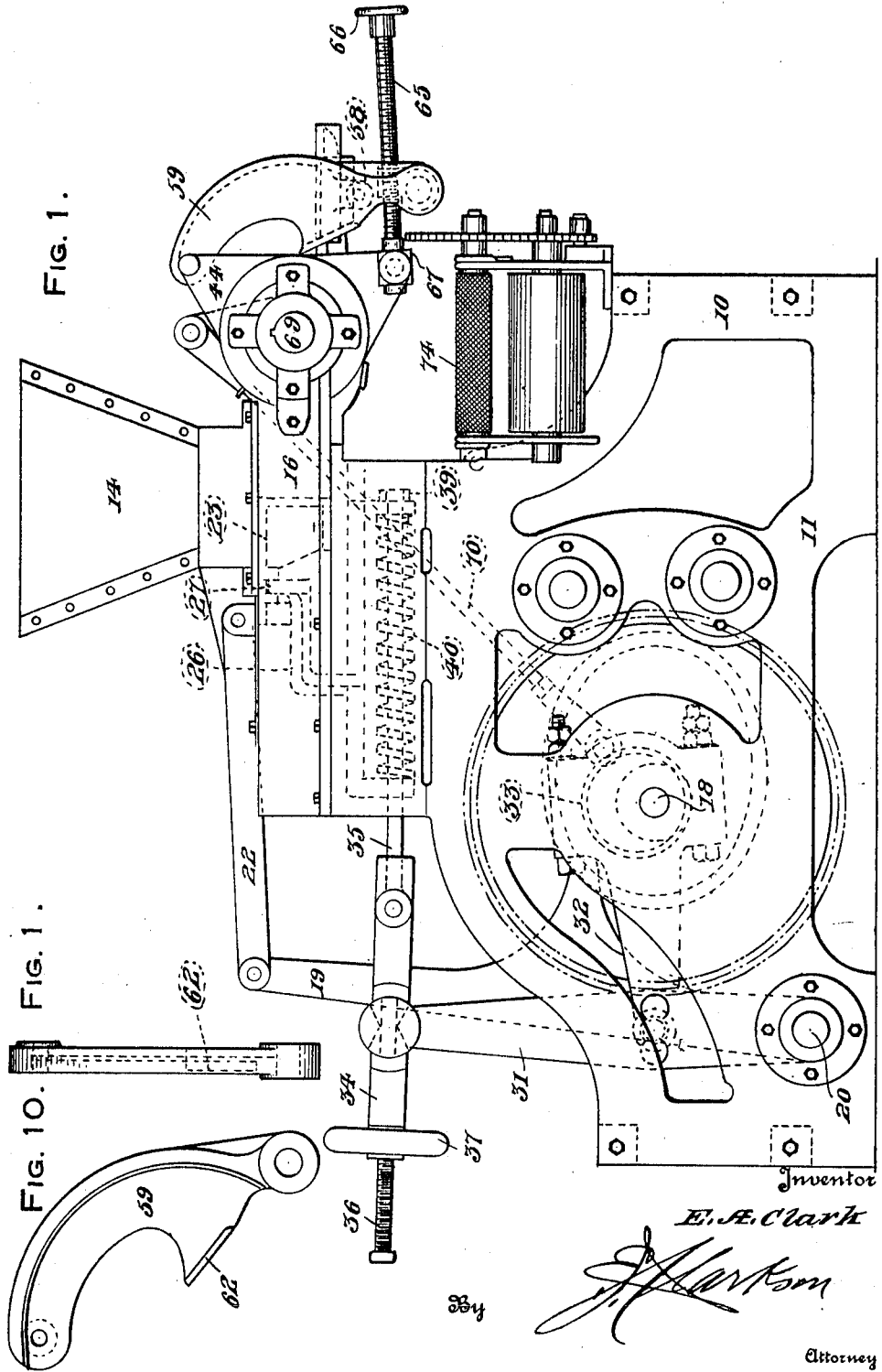

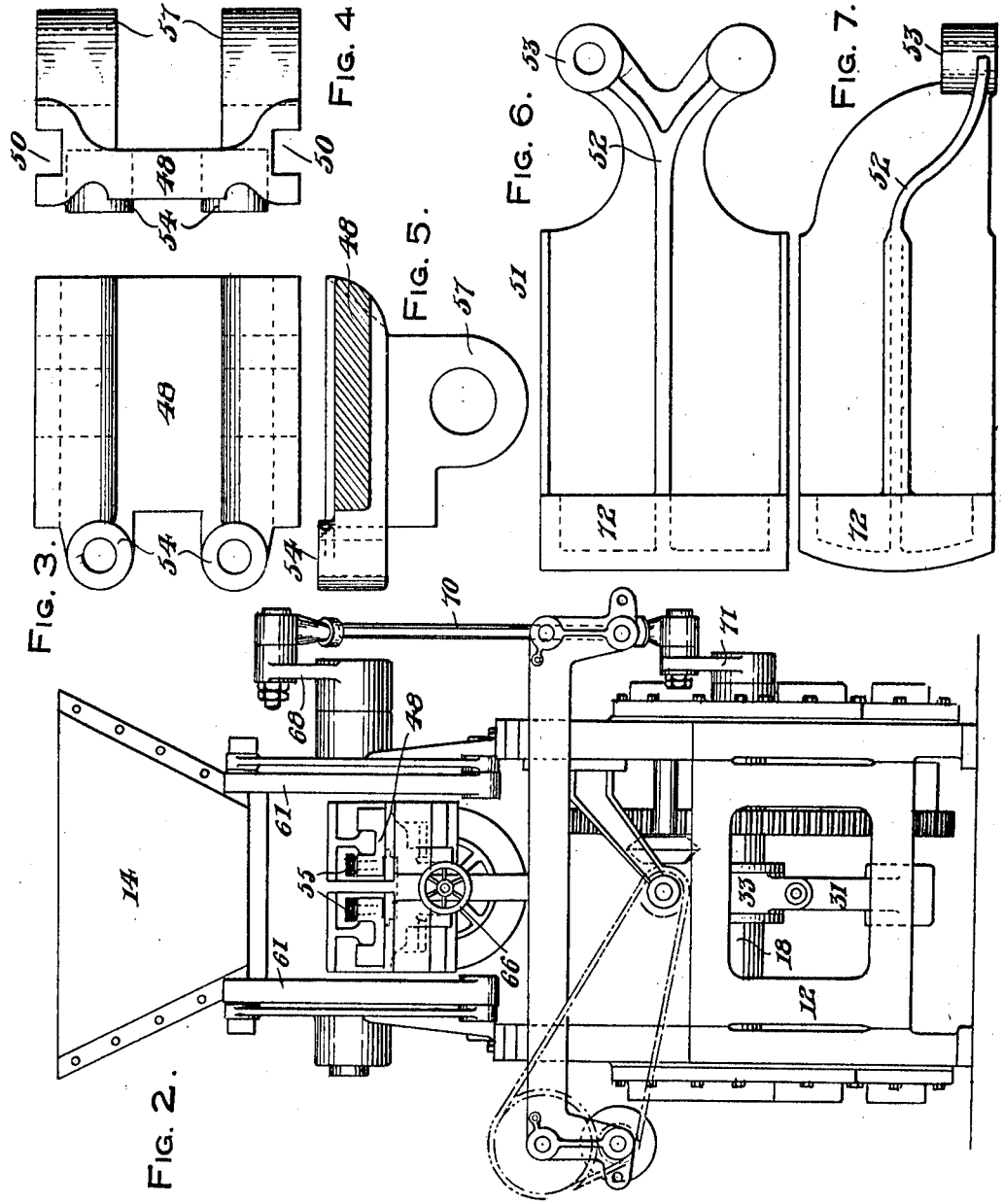

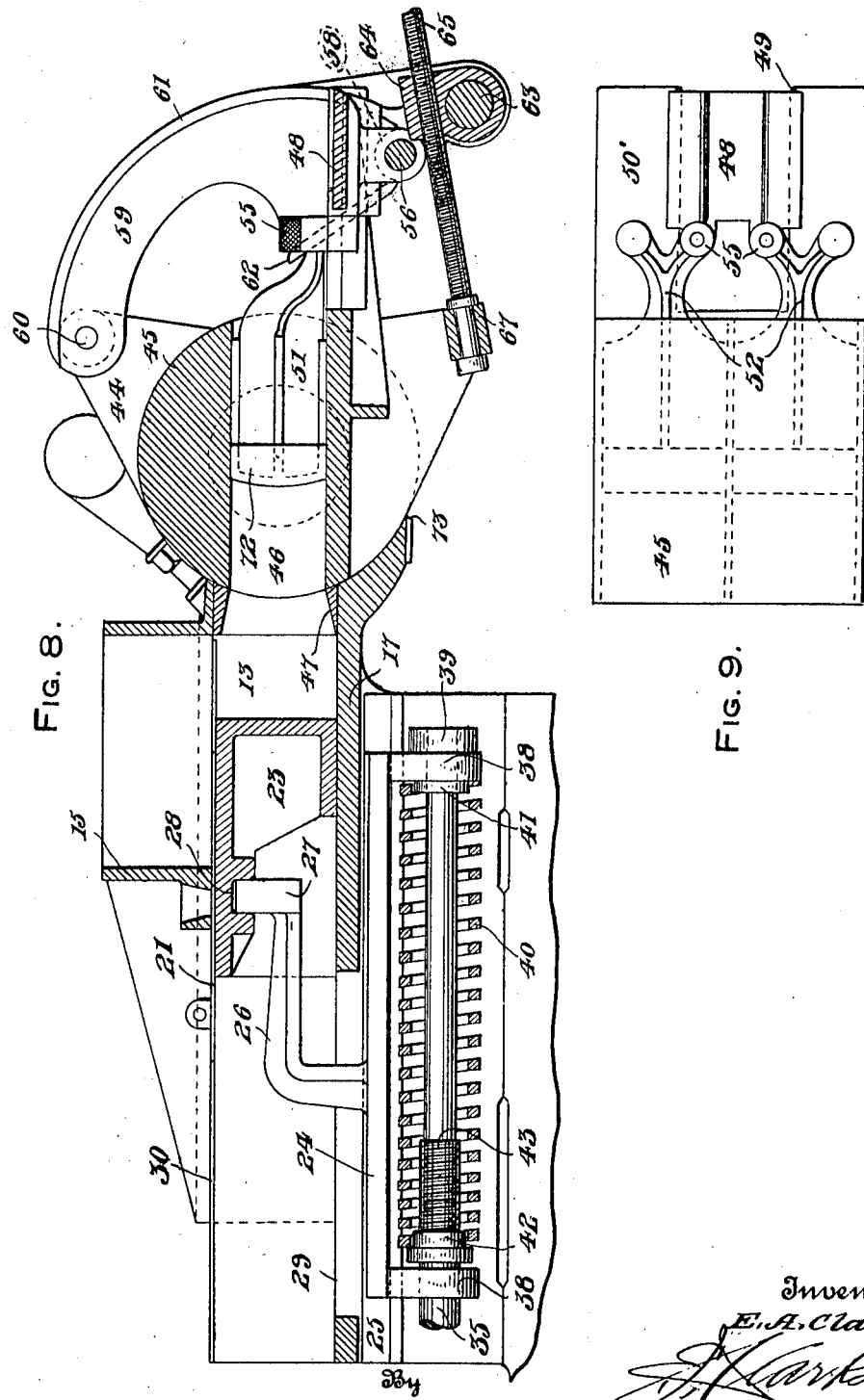

ELMER A. CLARK, OF JOLIET, ILLINOIS.

DOUGH-DIVIDING MACHINE.

1,314,245.   Specification of Letters Patent.   Patented Aug. 26, 1919.

Application filed June 8, 1918. Serial No. 283,822.

*To all whom it may concern:*

Be it known that I, ELMER A. CLARK, a citizen of the United States of America, residing at Joliet and State of Illinois, have invented certain new and useful Improvements in Dough-Dividing Machines, of which the following is a specification.

This invention relates to new and useful improvements in dough dividing machines.

The primary object of the invention is the provision of a machine for readily dividing dough into equal sized portions for forming loaves of bread, the device being adjustable for varying the size and weight of the loaf.

A further object of the invention is the provision of a dough dividing machine which possesses great strength and is arranged for adjusting the dividing means for forming different sized loaves during the operation of the device, resilient means being provided for the dough feeder for preventing breakage upon an overfeeding or clogging of the dough.

A still further object of the invention is the provision of a dough cutter with detachable plungers for automatically feeding and discharging the dough and whereby the device may be readily cleaned, provision being made for the main feeding plunger for cushioning the feeding operation while the limit of travel of the discharging plungers is adjustable while the machine is running for changing the size of the dough quantities or loaves.

With these general objects in view, the details of the invention will be further described and in the accompanying drawings in which like reference numerals designate corresponding parts throughout the several views, in the drawings:

Figure 1 is a side elevation of the machine;

Fig. 2 is a front elevation of the same;

Fig. 3 is a top plan view of the sliding block;

Fig. 4 is an end elevation thereof;

Fig. 5 is a sectional view of the block;

Fig. 6 is a top plan view of one of the adjustable plungers;

Fig. 7 is a side elevation thereof;

Fig. 8 is an enlarged vertical longitudinal sectional view through a portion of the device;

Fig. 9 is a top plan view of a portion of the machine at the forward end thereof showing the block and plungers;

Fig. 10 is a side view of one of the limiting cams; and

Fig. 11 is a front view thereof.

My dough dividing machine provides a substantially rectangular frame 10 having side plates 11 and connecting plates 12 somewhat after the usual construction of dough dividers and provided with a trough 13 extending longitudinally of the machine while dough is admitted into the trough through a hopper 14 having a connecting frame 15 positioned upon the casing 16 and provided with a bottom plate 17.

A power shaft 18 is journaled in the frame 10 through the side plates 11 and is operatively connected in any desired manner with a lever 19 pivoted at its lower end upon a shaft 20 carried by the frame 10. A knife 21 is slidably mounted at the bottom of the frame 15 and is connected with the upper end of the lever 19 by means of a link 22 and whereby the knife 21 will cut off the supply of dough from the trough 14 to the hopper 13 at regular predetermined intervals during the operation of the shaft 18.

A piston 23 is reciprocatably mounted within the trough 13 having a slide 24 slidably positioned in guide ways 25 of the bottom plate 17 of the machine. An angular arm 26 is carried by the slide 24 having a finger 27 freely positioned within a socket 28 of the hollow piston 23. A slot 29 in the bottom plate 17 permits the arm 26 to move for sliding the piston 23 to the desired extent through the trough 13. The slot 29 is of sufficient length to permit the arm 26 to be retracted rearwardly when desired to permit the piston 23 to be readily detached from the finger 27 through the open top 30 of the trough casing 16 rearwardly of the hopper casing 15, it being noted that the arm 22 and the blade 21 may be retracted for permitting this detachment of the piston.

An operating lever 31 is mounted upon the shaft 20 and operated simultaneously with the aforementioned lever 19 by being operatively connected to the shaft 18 by means of a pitman 32 connected to said shaft 18 by means of an eccentric disk 33. A sleeve 34 is pivotally mounted upon the upper free end of the lever 31 carrying a rod 35 therethrough with a threaded rear portion 36 having a locking wheel 37 thereon by means of which the rod 35 may be secured in its adjusted position through the sleeve 34. The said rod 35 is slidably positioned through perforated lugs 38 at the opposite ends of the slide 24, a head 39 being positioned at the forward end of the said rod for limiting the rearward movement of the rod relatively of the slide 24.

A helical spring 40 encircles the rod 35 between the lugs 38 with the forward end of said spring bearing against the forwardly positioned one of said lugs surrounding a boss 41 carried by the inner side of said forward lug 38. The rear end of the spring 40 engages an adjusting nut 42 adapted for turning upon a threaded portion 43 of the said rod 35 and whereby the tension of the spring 40 may be readily adjusted.

Spaced plates 44 are positioned adjacent the forward end of the machine, one at either side thereof and provided with a substantially cylindrical head 45 journaled therebetween provided with transverse pockets 46 adapted for receiving dough from the trough 13 through a mouth portion 47 carried by the trough. A block 48 is slidably mounted in a slot 49 at the forward end of a plate extension 50′ carried by the head 45 of the machine, the said block having grooves 50 in its opposite sides for receiving the opposite edges of the slot 49. A plunger 51 is provided for slidably moving within each of the pockets 46, each plunger having a forward extension 52 provided with a perforated boss 53 pivotally connected to a similar boss 54 at the rear end of the block 48 by means of a screw 55.

A shaft 56 is provided through spaced ears 57 depending from the opposite sides of the block 48 and a roller 58 is provided upon each end of the shaft 56 outwardly of said ears 57. A cam 59 is pivoted as at 60 adjacent the top of each of the forward side plates 44 of the machine. Each of the cams 59 is provided with a curved peripheral flange 61 against which the rollers 58 are adapted to normally engage as well as to move during the revolving of the head 45 when the dough is being discharged from the pockets 46. An inclined rear flange 62 is provided at the lower end of each cam 59 and it will be noted that the rollers 58 are positioned between the lower end portions of the cam flanges 61 and 62 when the plungers 51 are positioned horizontally within the pockets 46 for admitting the desired amount of dough from the trough 13. The cams 59 are connected together at their lower ends by means of a rod 63 having a sleeve 64 journaled thereon through which the adjusting screw 65 is threaded. A hand wheel 66 is provided upon the forward free end of the screw 65 while the rear end of said screw is journaled in a connecting strip 67 positioned between the lower ends of the plates 44.

An arm 68 is secured to one end of the axle 69 of the cylindrical head 45 and is connected by means of a rod 70 with a crank arm 71 carried by the power shaft 18.

The machine is operated by means of the shaft 18 and the knife 21 operates in the usual manner cutting off a quantity of dough received in the trough 13 from the hopper 14 while the piston 23 immediately follows up the movement of the said knife and forces the dough out of the trough 13 through the connecting mouth 47 into the pockets 46 of the head 45. The heads 72 of the plungers 51 form the forward ends of the pockets 46 and by the adjustment of said plungers 51 by means of the screw 65, the amount of dough which can be forced into the pockets 46 by the piston 23 depends entirely upon this adjustment of the said plungers. The connecting rod 70 has alternate reciprocations for turning the head 45 back and forth substantially a quarter revolution while the movements of the head are so timed as to position the pockets in alinement with the trough 13 during the forward movements of the piston 23 and to permit the turning of the head 45 to arrange the pockets 46 substantially vertically when the piston 23 is at the limit of its forward travel with the pockets 46 filled with dough.

The downward movement of the arm 68 revolves the head 45 with its plungers 51 and blocks 48 and the rollers 58 being in contact with the cam flanges 61 permits the rollers to ride upon said flanges during the upward movement of the block 48. When the head 45 is positioned with the rollers 58 at the upward limit of their movement, the pockets 46 and plungers 51 will be substantially vertical while the flanges 61 have forced the plungers 51 downwardly through the pockets 46 for discharging the dough out of the forward end of the machine as at 73 for reception upon an endless conveyer 74 of the usual form positioned therebeneath. The adjusting screw 65 does not move with the head 45 while the block 48 moves with the said head, the said rollers 58 freely turning in their travel along the flanges 61 of the cams 59. When the head 45 is at its discharge point, the rollers 58 and shaft 56 are in axial alinement with the pivot points 60 of the cams 59, this always being the case no matter where the lower end of the cams 59 may be adjusted by the screw 65 for permitting the predetermined amount of dough to be received in the pockets 46. Regardless of the size of the loaf or quantity of dough for which the plungers 51 may be arranged, the head 72 of the plungers will be positioned at the rear ends of the pockets 46 at the periphery of the head 45 when the head is turned to its discharge point with the pockets 46 positioned substantially vertical and the rollers 58 in alinement with the pivot points 60.

After the dough has been discharged the head 45 returns to its normal position with the pockets 46 horizontal bringing the rollers 58 into engagement with the lower flanges 62 of the cams 59, which forces the said rollers downwardly upon the inclined flanges 62 to the lower limit of movement of the rollers 58 and block 48 and at which time the plungers 51 will be in their adjusted positions. The lowering therefore of the block 48 upon the returning of the head 45 to its normal position positively retracts the plungers 51 with the heads 72 thereof forming the forward ends of the pockets 46 to admit the desired amount of dough from the trough 13 as regulated by the screw 65. The screw 65 is readily turned by the wheel 66 for shifting the block 48 and its plungers 51 inwardly or outwardly as found desirable when the machine is either in operation or at rest.

The operation of the rod 35 in reciprocating the piston 23 during the turning of the shaft 20 will be fully understood from this detailed description thereof, it being noted that the spring 40 renders the piston 23 slightly resilient in its operation upon the dough in the trough 13 and in the event of an excess of dough or a clogging of the same, the piston 23 may stop in its movement while the rod 35 will continue its forward movement sliding through the lugs 38. The arranging of the spring 40 upon the slide 24 at a distance from the piston 23 permits the said piston to be readily removed from the trough 13 without removing or interfering with the said spring. It will be understood that the timing of the levers 19 and 31 for cutting the dough by means of the knife 21 and pushing the dough by means of the piston 23 will be set in any well known and usual manner which is also true of the timing of the operations of the rod 70 for imparting alternate partial rotations to the head 45. The plungers 51 may be readily removed for cleaning or other purposes by detaching the plunger extensions 52 from the block 48 by removing the screws 55. The discharge of the dough from the pockets 46 is positive while the dough entering the said pockets may assist in retracting the plungers 51 for engaging the same against the forward flanges 61 of the cams 59 with the plungers at the forward limit of their movement. The pressure of the dough against the plungers within the pockets always tends to forwardly move the plungers with the rollers engaging the flanges 61 of the cams so that the operative use of the cams may only take place at the extremities of the up and down movements of the block rollers.

What I claim as new is:—

1. In combination with the frame of a dough divider having a trough, a hollow piston slidably positioned in the trough having spaced ears, a slide carried by the frame, an angular arm upon said slide, a finger at the free end of said arm freely positioned between the said ears whereby the piston is detachable from the machine at the rear extremity of its movements, depending lugs at the ends of the slide, an operating rod slidably positioned through said lugs, spring connections between said rod and one of said lugs, and reciprocating means for the rod.

2. A dough divider comprising a frame having a trough and bottom plate for said trough provided with a longitudinal slot, dough feeding means for said trough, a slide reciprocatably mounted beneath said bottom plate, detachable connections between said slide and dough feeding means extending through said slot, depending perforated lugs at the ends of said slide, an operating rod slidably positioned through said lugs, a movement limiting head upon the forward end of said rod outwardly of one of said lugs, an adjustable nut threaded upon said rod between said lugs, a spring encircling said rod and positioned between said nut and the forwardmost lug at the opposite end of the slide, and reciprocating means for said rod whereby said dough pushing means is adapted for reciprocation within said trough.

3. In combination with a dough divider having a frame provided with a dough receiving trough, a cylindrical head journaled forwardly of the frame having transverse dough receiving pockets therethrough adapted for normal positioning forwardly of the trough, a block slidably mounted at the forward end of the machine, a plunger within each of said pockets detachably pivotally connected to said block, rollers carried by the opposite sides of said block, a cam pivoted at each side of the block having an inclined flange adapted for contact with said rollers during the downward movement of the block whereby the amount of retraction of said plungers is adapted to be positively controlled, and adjusting means for the said cams.

4. In combination with a dough divider having a frame provided with a dough receiving trough, a cylindrical head journaled forwardly of the frame having transverse dough receiving pockets therethrough adapted for normal positioning forwardly of the trough, a block slidably mounted at the forward end of the machine, a plunger within each of said pockets detachably pivotally connected to said block, opposite cams pivoted adjacent said head, a forward curved flange and a rear inclined flange upon each cam, the said rollers being adapted for riding upon said forward flanges during the upward movement of the block and the dough discharging movements of said plungers, the said rollers being adapted for engaging the rear inclined flanges of the cams during the downward movement of the block during the retraction of said plungers within the pockets and simultaneous adjusting means for said cams operable during the running of the machine.

5. In a dough divider having a feeding trough for the dough, a cylindrical head journaled forwardly of the machine with transverse pockets normally positioned opening adjacent said trough adapted for receiving dough from said trough, a block slidably carried by said head forwardly thereof, a plunger within each of said pockets pivoted to the said block, means adapted for automatically retracting the said block and plungers to their forward limit of travel during the downward movement of the block when the head is partially revolved, and adjusting means for said retracting means whereby the capacity of the pockets for receiving the dough is regulated at will.

6. A dough divider including a frame, a cylindrical head journaled therein having transverse dough receiving pockets, means adapted for partially revolving said head in opposite directions, a block slidably supported by said head and rotarially movable therewith, a plunger within each pocket pivotally connected to said block, means adapted for positively moving the said plungers in opposite directions to their limits of movement in said pockets, and means associated with said moving means adapted for adjusting the amount of positive retraction of said plungers whereby the dough receiving capacity of the pockets is changed at will.

7. A dough divider including a frame, a cylindrical head journaled therein having transverse dough receiving pockets, means adapted for partially revolving said head in opposite directions, a block slidably supported by said head and rotarially movable therewith, a plunger within each pocket pivotally connected to said block, rollers at the opposite ends of said block, cams pivoted at the opposite sides of the device having flanges adapted for engagement by said rollers for limiting the capacity of said pockets and automatically retracting the plungers within the pockets to their limit of movement for receiving dough, and adjusting means for the cams.

8. A dough divider including a frame, a cylindrical head journaled therein having transverse dough receiving pockets, means adapted for partially revolving said head in opposite directions, a block slidably supported by said head and rotarially movable therewith, a plunger within each pocket pivotally connected to said block, rollers at the opposite ends of said block, cams pivoted at the opposite sides of the device having curved front flanges adapted for engagement by said rollers for limiting the capacity of said pockets and automatically projecting the plungers through the pockets in the dough discharging operation, and adjusting means for the cams, inclined flanges opposite said curved flanges of the cams adapted for engagement by said rollers during the downward movement of the block whereby said plungers are automatically retracted during the rear rotative movement of the head to the limit of its dough receiving position.

In testimony whereof I affix my signature.

ELMER A. CLARK.

Copies of this patent may be obtained for five cents each, by addressing the "Commissioner of Patents, Washington, D. C."